(12) United States Patent
Yee et al.

(10) Patent No.: US 8,209,703 B2
(45) Date of Patent: Jun. 26, 2012

(54) APPARATUS AND METHOD FOR DATAFLOW EXECUTION IN A DISTRIBUTED ENVIRONMENT USING DIRECTED ACYCLIC GRAPH AND PRIORITIZATION OF SUB-DATAFLOW TASKS

(75) Inventors: Monfor Yee, San Francisco, CA (US); Wu Cao, Redwood City, CA (US); Hui Xu, Cupertino, CA (US); Anil Kumar Samudrala, Newark, CA (US); Balaji Gadhiraju, Cupertino, CA (US); Kurinchi Kumaran, San Jose, CA (US); David Kung, Cupertino, CA (US)

(73) Assignee: SAP France S.A., Paris (FR)

( * ) Notice: Subject to any disclaimer, the term of this patent is extended or adjusted under 35 U.S.C. 154(b) by 1068 days.

(21) Appl. No.: 11/952,483

(22) Filed: Dec. 7, 2007

(65) Prior Publication Data
US 2008/0172674 A1    Jul. 17, 2008

Related U.S. Application Data

(60) Provisional application No. 60/869,272, filed on Dec. 8, 2006.

(51) Int. Cl.
*G06F 9/54* (2006.01)
*G06F 9/44* (2006.01)
*G06F 9/46* (2006.01)
*G06F 5/00* (2006.01)
*G06F 3/00* (2006.01)

(52) U.S. Cl. ............. 718/106; 718/103; 710/5; 710/6; 710/20; 710/21; 710/52; 719/320

(58) Field of Classification Search ............. 718/103, 718/106
See application file for complete search history.

(56) References Cited

U.S. PATENT DOCUMENTS

| | | | | |
|---|---|---|---|---|
| 5,999,729 A * | 12/1999 | Tabloski et al. | ............ | 717/105 |
| 6,308,326 B1 * | 10/2001 | Murphy et al. | ............ | 717/174 |
| 6,389,427 B1 * | 5/2002 | Faulkner | ............ | 707/741 |
| 6,434,590 B1 * | 8/2002 | Blelloch et al. | ............ | 718/102 |
| 6,711,616 B1 * | 3/2004 | Stamm et al. | ............ | 709/226 |
| 6,889,244 B1 * | 5/2005 | Gaither et al. | ............ | 709/202 |
| 7,467,383 B2 * | 12/2008 | Inchingolo et al. | ............ | 718/104 |
| 7,926,051 B2 * | 4/2011 | Barta et al. | ............ | 717/174 |
| 7,930,700 B1 * | 4/2011 | Basu et al. | ............ | 718/102 |
| 2001/0034752 A1 * | 10/2001 | Kremien | ............ | 709/105 |
| 2002/0002578 A1 * | 1/2002 | Yamashita | ............ | 709/105 |
| 2002/0107962 A1 * | 8/2002 | Richter et al. | ............ | 709/225 |
| 2003/0033438 A1 * | 2/2003 | Gremmelmaier et al. | ............ | 709/310 |
| 2003/0236837 A1 * | 12/2003 | Johnson et al. | ............ | 709/205 |
| 2005/0071842 A1 * | 3/2005 | Shastry | ............ | 718/100 |
| 2005/0278152 A1 * | 12/2005 | Blaszczak | ............ | 703/1 |

\* cited by examiner

*Primary Examiner* — Meng An
*Assistant Examiner* — Kevin X Lu
(74) *Attorney, Agent, or Firm* — Mintz, Levin, Cohn, Ferris, Glovsky and Popeo, P.C.

(57) ABSTRACT

A computer readable storage medium includes executable instructions to assess system cache resources, inter-process communication requirements and staging requirements to divide an extract, transform, load (ETL) dataflow task into a plurality of sub-tasks. The sub-tasks are then executed in parallel on distributed resources.

18 Claims, 15 Drawing Sheets

APPARATUS AND METHOD FOR DATAFLOW EXECUTION IN A DISTRIBUTED ENVIRONMENT USING DIRECTED ACYCLIC GRAPH AND PRIORITIZATION OF SUB-DATAFLOW TASKS

This application claims priority to U.S. Provisional Patent Application 60/869,272, filed Dec. 8, 2006, entitled "Apparatus and Method for Distributed Dataflow Execution in a Distributed Environment", the contents of which are incorporated herein by reference.

BRIEF DESCRIPTION OF THE INVENTION

This invention relates generally to the processing of digital data. More particularly, this invention relates to the transport of digital data from one resource to another.

BACKGROUND OF THE INVENTION

Extract, Transform and Load (ETL) refers to a process in which data is extracted from a data source, it is transformed in accordance with specified criteria (e.g., to fit a specified business need and/or quality level), and it is then loaded into a target (e.g., a data warehouse). ETL tasks are growing in complexity, which means they are requiring increasing levels of computational support.

It is desirable to parallel process data flows associated with an ETL task to improve computational efficiency. However, determining how to parallel process data flows is difficult.

Accordingly, it would be advantageous to provide a technique for dividing an ETL dataflow task into sub-tasks for execution on distributed resources. Ideally, such a technique would account for contextual information, such as cache resources, inter-process communication requirements and staging requirements.

SUMMARY OF THE INVENTION

A computer readable storage medium includes executable instructions to assess system cache resources, inter-process communication requirements and staging requirements to divide an extract, transform, load (ETL) dataflow task into a plurality of sub-tasks. The sub-tasks are then executed in parallel on distributed resources.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
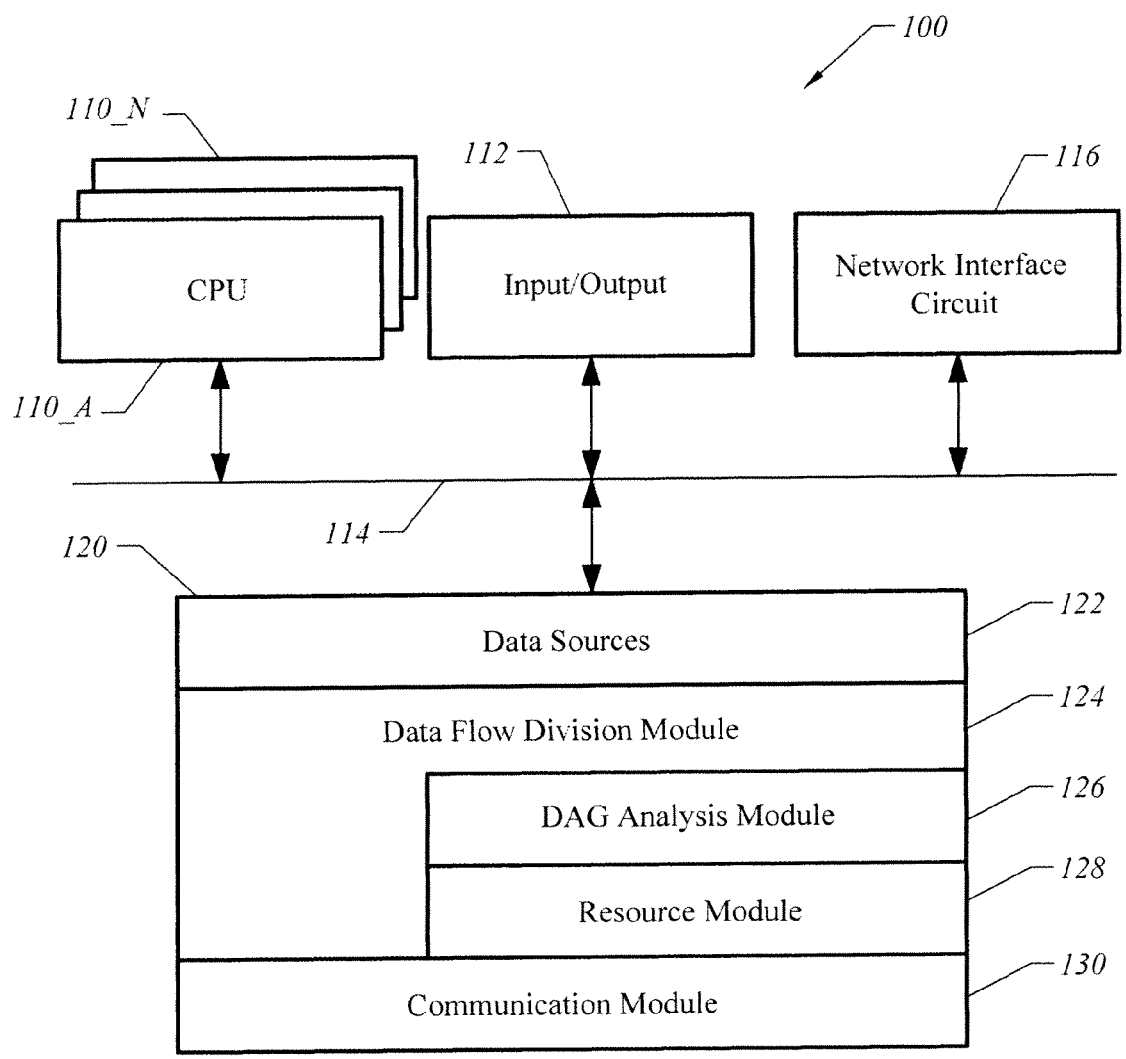
FIG. 1 illustrates a computer configured in accordance with an embodiment of the invention.

FIG. 1 illustrates a computer 100 configured in accordance with an embodiment of the invention. The computer 100 includes standard components, such as a set of central processing units (CPU) 110_A through 110_N. Thus, computer 100 is a multi-processor machine capable of supporting parallel processing operations. Each CPU 110 is connected via a bus 114 to input/output devices 112. The input/output devices 112 may include standard components, such as a keyboard, mouse, display, printer and the like. Also connected to the bus 114 is a network interface circuit 116, which supplies connectivity to a network (not shown). Various resources in the network may also be used to support distributed processing operations associated with the invention.

A memory 120 is also connected to the bus 120. The memory 120 stores various data sources 122, which may operate as data sources for ETL tasks. A data flow division module 124 includes executable instructions to implement operations associated with the invention. In particular, the data flow division module 124 includes executable instructions to divide an ETL dataflow task into a set of sub-tasks. The data flow division module 124 may operate on data sources 122 or other data sources accessible through the network interface circuit 116. This data flow division module 124 analyzes such issues as system cache resources, inter-process communication requirements and staging requirements. In one embodiment, the data flow division module 124 includes a directed acyclic graph (DAG) analysis module 124 with executable instructions to model the dataflow task as a DAG and then make processing decision based upon an analysis of the DAG.

A resource module 128 includes executable instructions to analyze various resources, such as cache resources, cluster level resources, current resource loads and the locality of objects to be accessed by a sub-task. This analysis is used to tailor the division and distribution of sub-tasks among different distributed resources, such as different CPUs 110_A through 110_N or different machines accessible through the network interface circuit 116. The distributed resources may also be in the form of caches, database accesses, and the like.

A communication module 130 includes executable instructions to support communications between sub-tasks. The communication module 130 may include executable instructions to support named pipe communications between sub-tasks, peer-to-peer communications between sub-tasks and/or centralized message broker communications between sub-tasks.

The data flow division module 124 and communication module 130 may form a portion of a larger ETL tool or may be accessible by an ETL tool. Computer 100 may operate as a source and/or a target for a dataflow task. Other network resources accessible through the network interface circuit 116 may operate as a source and/or target of a dataflow task coordinated by the data flow division module 124 and the communication module 130. The modules in memory 120 are exemplary. These modules may be formed as a single model or they may be distributed into additional modules. The modules may also be distributed across a network. It is the operations of the invention that are significant, not where or how they are implemented.

The invention distributes CPU and/or memory intensive dataflow tasks, such as join, group, table comparison and lookup, across multiple CPUs and/or computers to take advantage of more CPU power and physical memory. In doing so, the invention avoids virtual-memory limits and secures better job performance and scalability. In one embodiment, the invention allows for the specification of cache type, such as selecting an in-memory cache, a paging (or pagable) cache and/or a partitioned cache.

An embodiment of the invention divides a dataflow task into one of five tasks. A type-1 task is a single process mode with in-memory cache. A type-2 task is a single process mode with a paging cache. A type-3 task uses multiple process modes with inter-process communication. A type-4 task uses multiple process modes with staging between processes. A type-5 task uses multiple process modes with mixed staging and inter-process communications between sub-tasks. Each type of task is discussed below.

A type-1 task uses a single process mode with in-memory cache. The in-memory cache is not pageable. Thus, when the data to be cached exceeds the virtual memory limit, the user gets an "out of memory" error. Typically, a type-1 task is used on a relatively small data set (e.g., less than a million rows).

Figure 2:
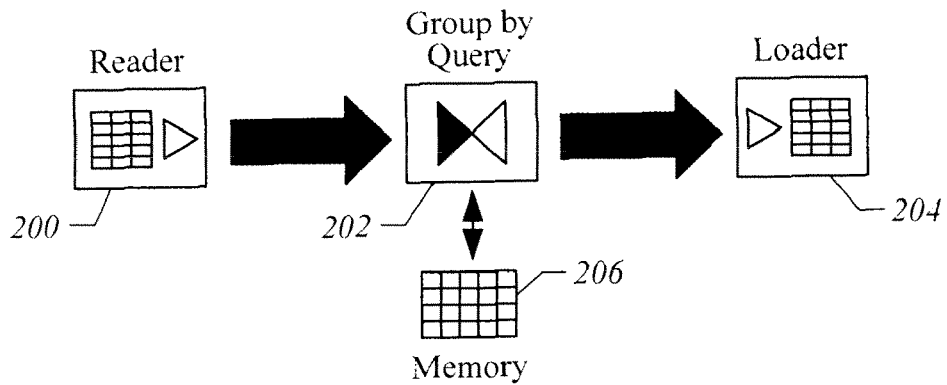
FIG. 2 illustrates a type-1 task processed in accordance with an embodiment of the invention.
Figure 3:
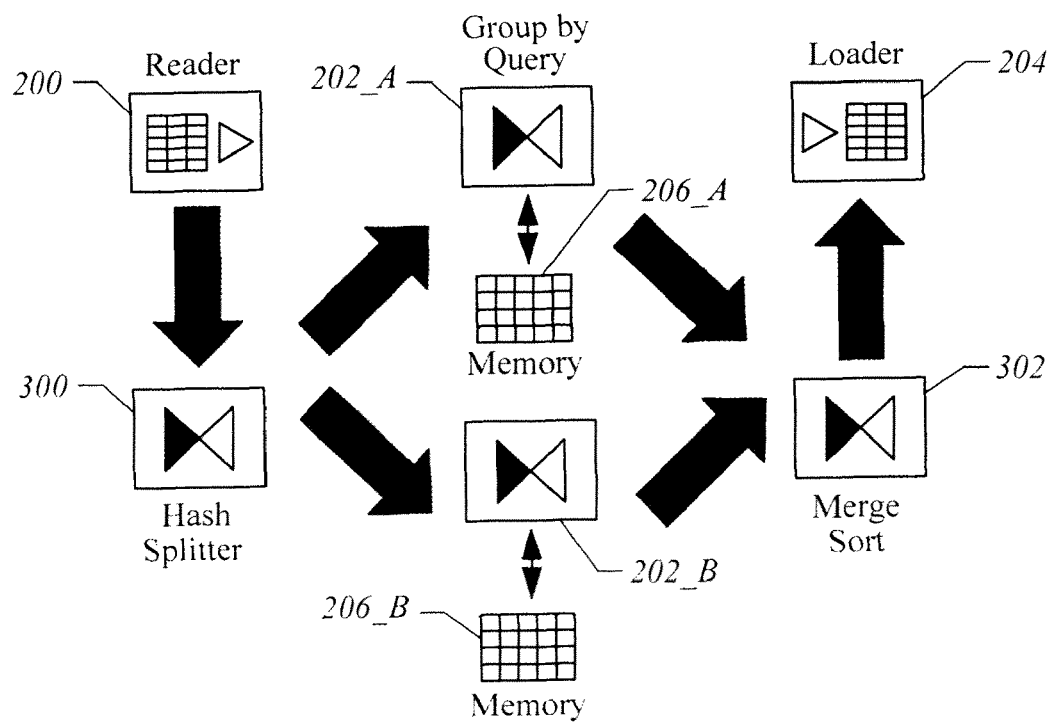
FIG. 3 illustrates the task of FIG. 2 implemented with two degrees of parallelism.

FIG. 2 illustrates a type-1 task for a dataflow that comprises a reader module 200, a group by query module 202 and a table loader module 204. The group by query module 202 accesses an in-memory cache 206. In accordance with an embodiment of the invention, a degree of parallelism may be specified. For example, if a degree of parallelism of 2 is specified for the dataflow of FIG. 2, the dataflow of FIG. 3 results. FIG. 3 illustrates a hash splitter module 300 to divide the data flow in two and apply it to a first group by query module 202_A and a second group by query module 202_B, which respectively access a memory 206_A and memory 206_B. The results are merged with a merge module 302, which applies its output to a loader 204.

Figure 4:
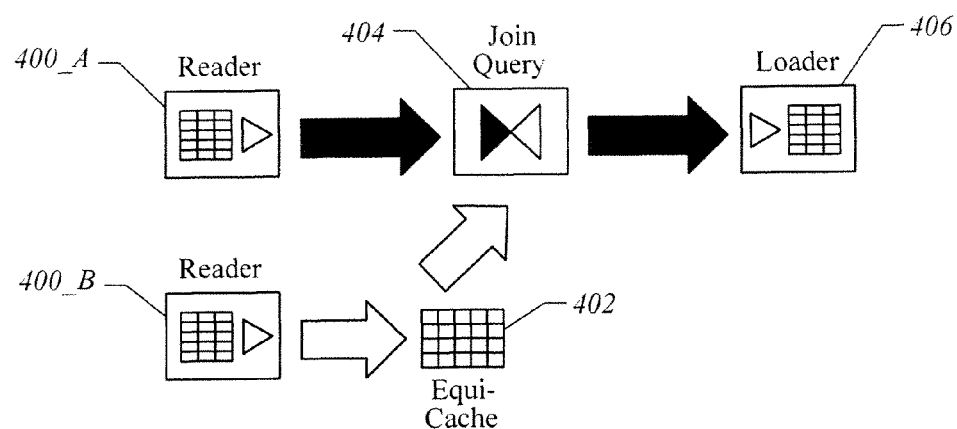
FIG. 4 illustrates a type-1 task with two sources and an inner cached looped processed in accordance with an embodiment of the invention.
Figure 5:
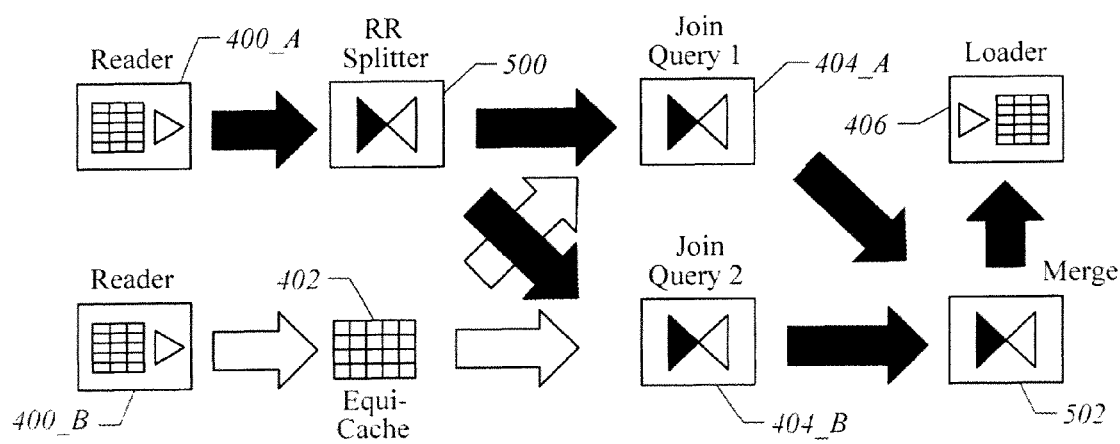
FIG. 5 illustrates the task of FIG. 4 implemented with two degrees of parallelism.

FIG. 4 illustrates a type-1 task that joins data from two data sources accessed by a first reader module 400_A and a second reader module 400_B. A join query module 404 uses cache 402 for inner loop join operations. The output of the join module is applied to loader 406. The operations of FIG. 4 may be parallelized, as shown in FIG. 5. FIG. 5 includes a round robin splitter module 500 that divides the source data from reader module 400_A into two flows, which are applied to join module 404_A and join module 404_B, which share the same cache 402. The results from the join modules are merged at merge module 502 and are applied to loader 406.

Figure 6:
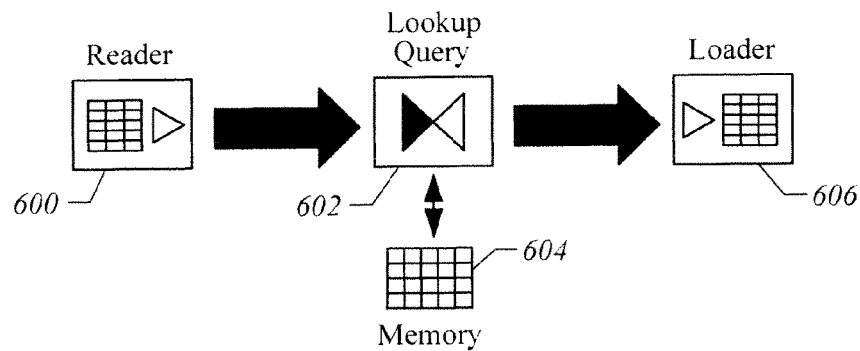
FIG. 6 illustrates a type-1 task utilizing a query lookup table in accordance with an embodiment of the invention.
Figure 7:
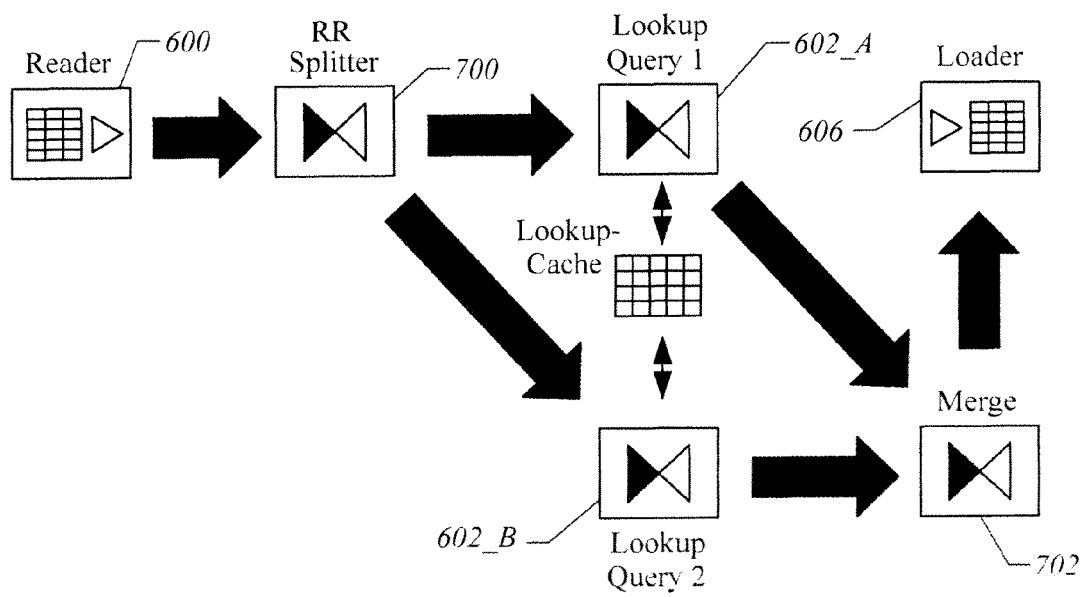
FIG. 7 illustrates the task of FIG. 6 implemented with two degrees of parallelism.

FIG. 6 illustrates a reader module 600 that applies data to a lookup query module 602, which accesses an in-memory cache 604. The results are applied to a loader module 606. The dataflow of FIG. 6 may be parallelized, as shown in FIG. 7. FIG. 7 illustrates a reader module 600 applying data to a splitter 700, which applies split data to a first lookup query module 602_A and a second lookup query module 602_B. The results are merged at merge module 702, with the output being applied to a loader 606.

A type-2 task uses a single process mode with a paging cache. For example, the Berkeley Database™ sold by Oracle® Corporation, Redwood Shores, Calif., allows a user to specify the cache size, page size and other parameters. A paging cache supports a much larger data set, but paging may seriously degrade dataflow performance. Therefore the dataflow division module 124 preferably sets cache parameters based upon dataflow statistics to reduce paging.

Figure 8:
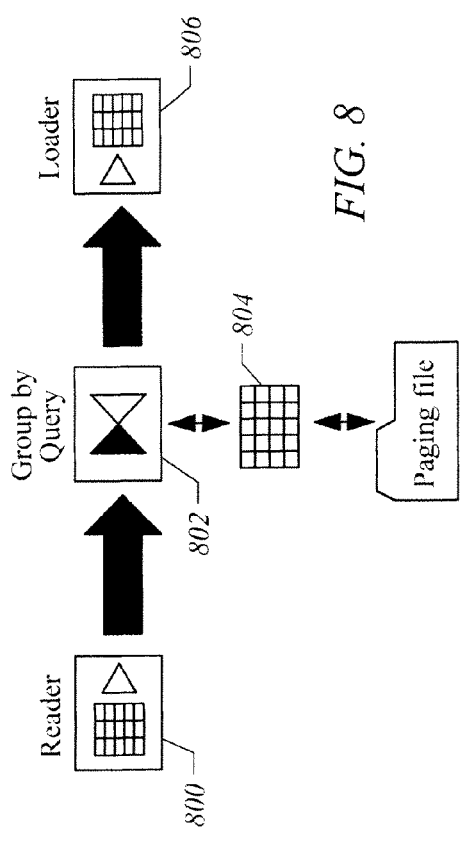
FIG. 8 illustrates a type-2 task using a single process mode with a paging cache in accordance with an embodiment of the invention.

Medium sized data sets (e.g., between approximately 1 and 10 million rows) are typically designated type-2 tasks. FIG. 8 illustrates a type-2 dataflow task utilizing a reader module 800 and a group by query module 802, which accesses a paging cache 804. Output is applied to a loader module 806.

A type-3 task uses multiple process modes with inter-process communication. A type-3 task is typically associated with a large data set (e.g., over 10 million rows). The data flow division module 124 breaks down the original dataflow into separate sub-dataflow processes, each of which handles a number of transforms or processes on one portion of the data. The data flow division module 124 will be influenced to designate a task as a type-3 task if one inserts a pipeline temporary store transform into a dataflow to divide the dataflow into smaller pieces. The temporary store transform is also referred to herein as a data transfer transform. Designating a transform or function to run as a separate process or the use of a partitioned cache results in a type-3 task designation.

In a type-3 task, one sub-dataflow process normally depends on another sub-dataflow process to produce or consume its input our output data. In the case of a join, the join sub-dataflow process may depend on two other sub-dataflow processes to produce its input data. The sub-process that produces data for another sub-process is called a producer. The sub-process that consumes the data produced by another sub-process is called a consumer. The DAG analysis module 126 treats a producer as an upstream node on a DAG and a consumer as a downstream node on the DAG. Inter-process communication is used in the type-3 task. The communication module 130 supports the specification of an inter-process communication reader on the consumer side and an inter-process communication loader on the producer side to allow communication between the producer and the consumer processes.

Figure 9:
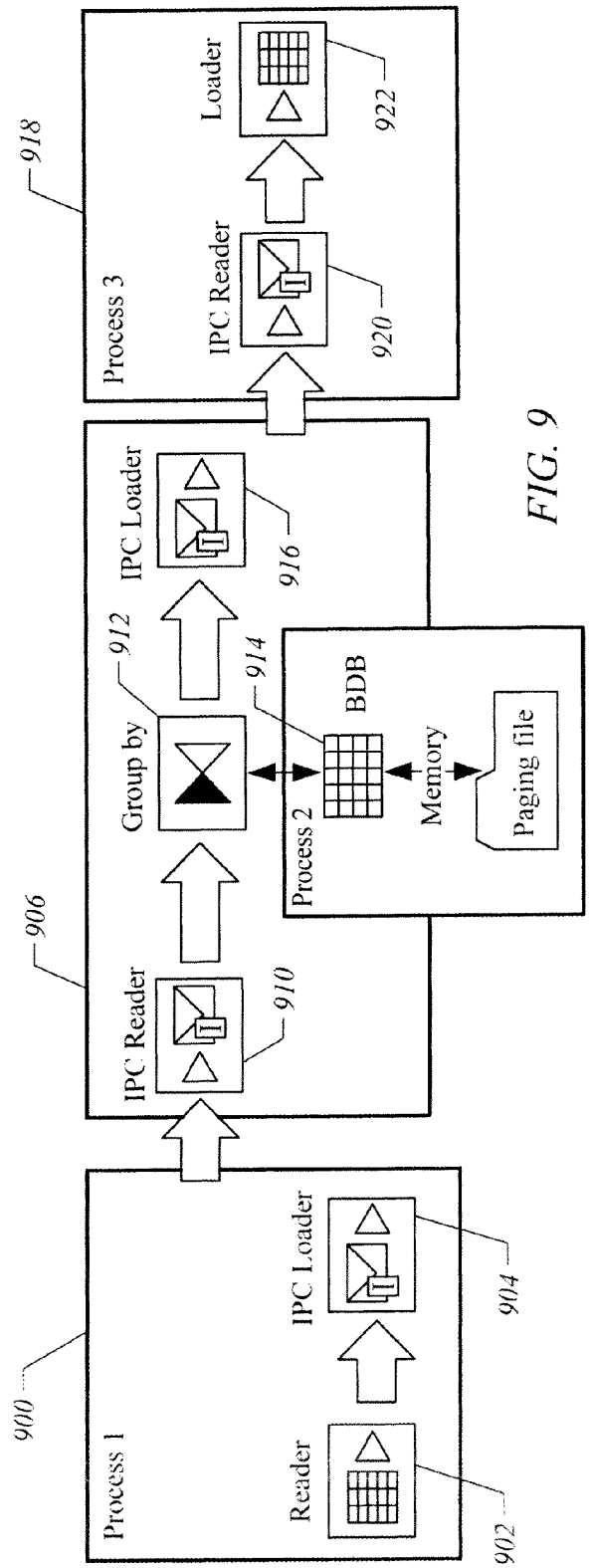
FIG. 9 illustrates a type-3, sub-type 1 task using multiple process modes with inter-process communication in accordance with an embodiment of the invention.

FIG. 9 illustrates a type-3 task where a group by query is run as a separate process, but a degree of parallelism is not set. FIG. 9 illustrates a first process 900 with a reader module 902 and an inter-process communication (IPC) loader 904. The second process includes an IPC reader 910 and a group by query module 912, which accesses a paging cache memory

914. An IPC loader 916 routes data to a third process 918, which includes an IPC reader 920 and a loader module 922.

Figure 10:
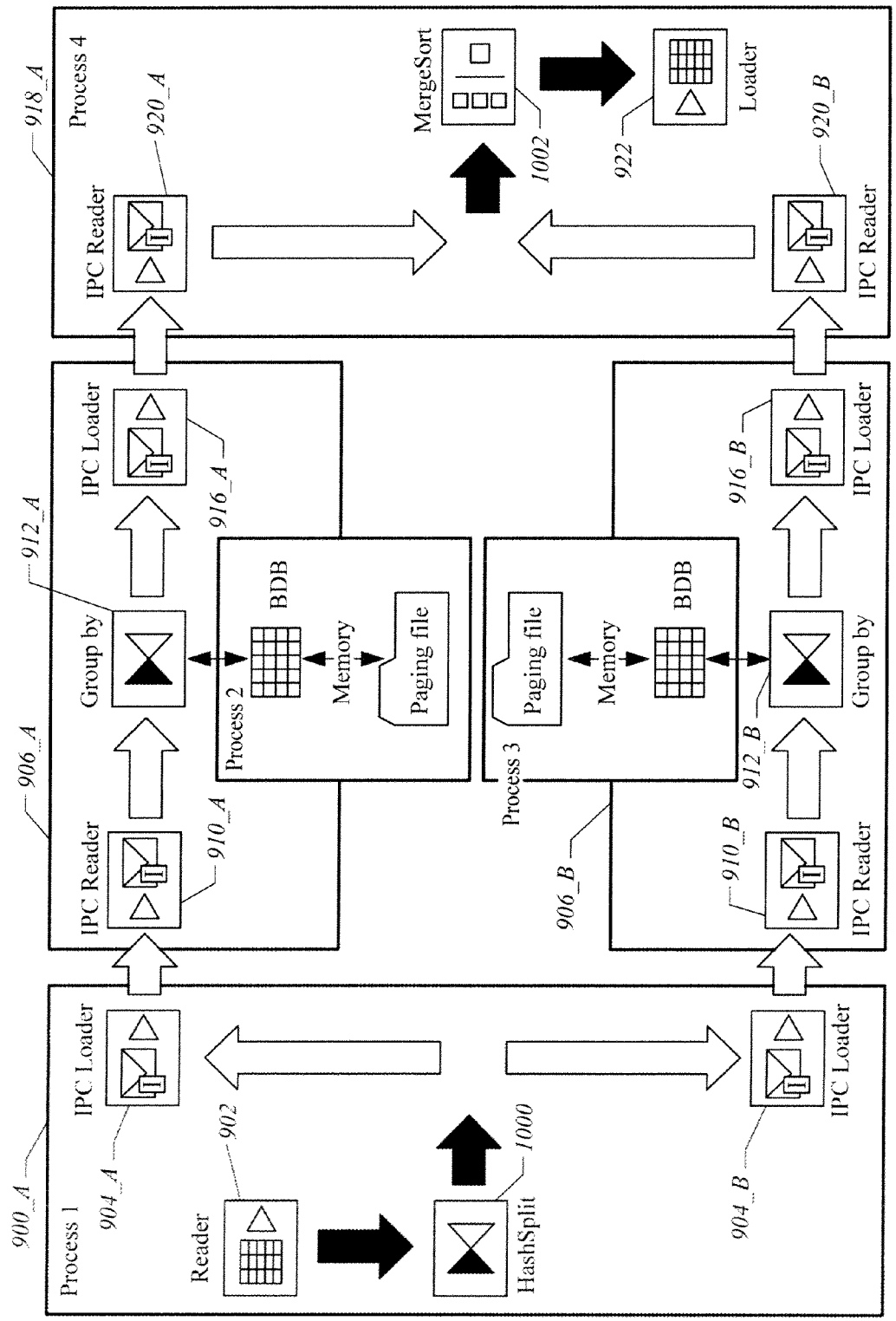
FIG. 10 illustrates a type-3, sub-type 2 task implemented in accordance with an embodiment of the invention.

FIG. 10 illustrates the dataflow task of FIG. 9 executed with two degrees of parallelism. The hash splitter module 1000 hashes the data from the file using the group by column of the hash key. This way, processes 906_A and 906_B each get only a portion of the data. The merge sort module 1002 of process 918_A merges the data together.

Figure 11:
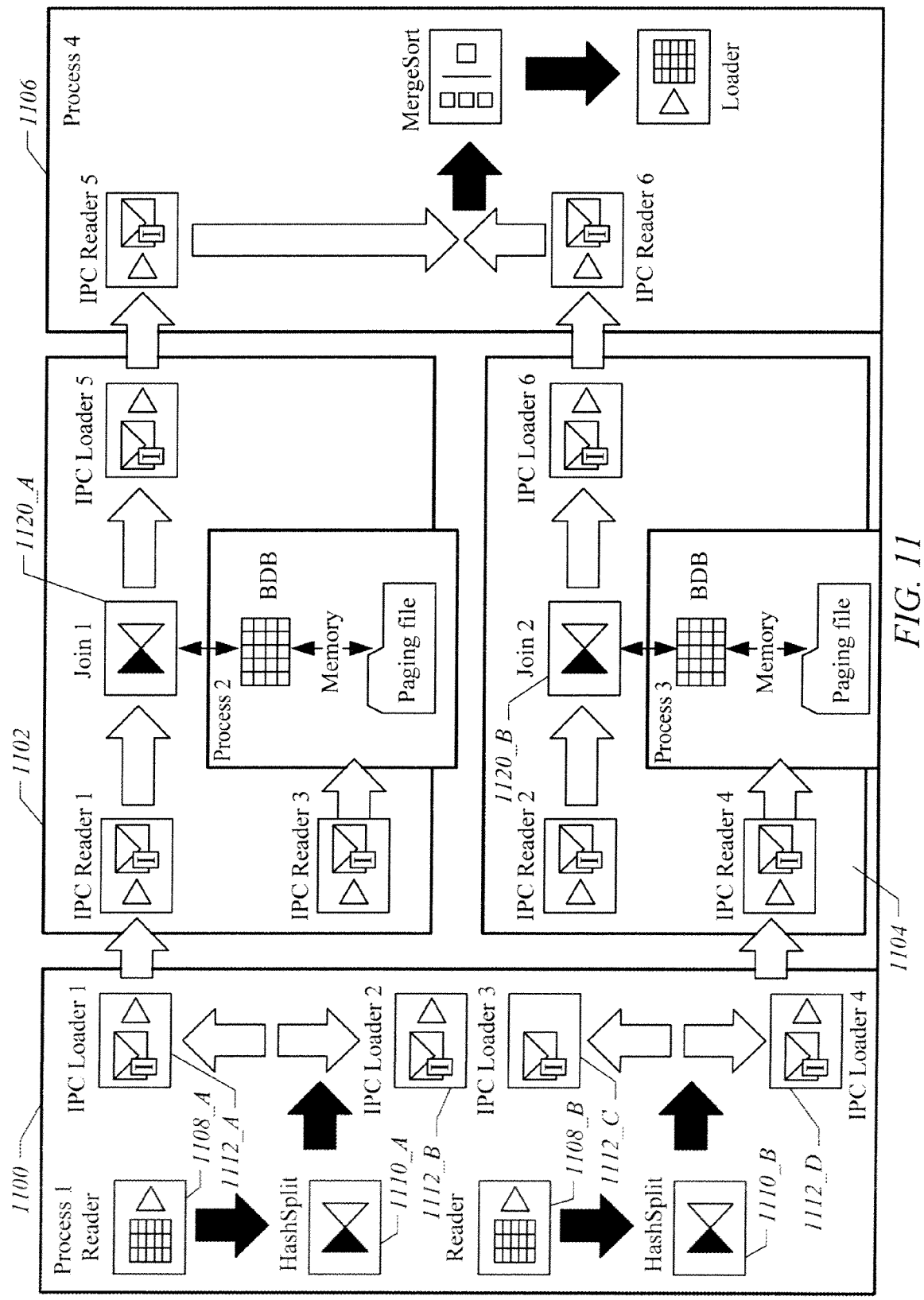
FIG. 11 illustrates the task of FIG. 2 implemented with two degrees of parallelism.
Figure 12:
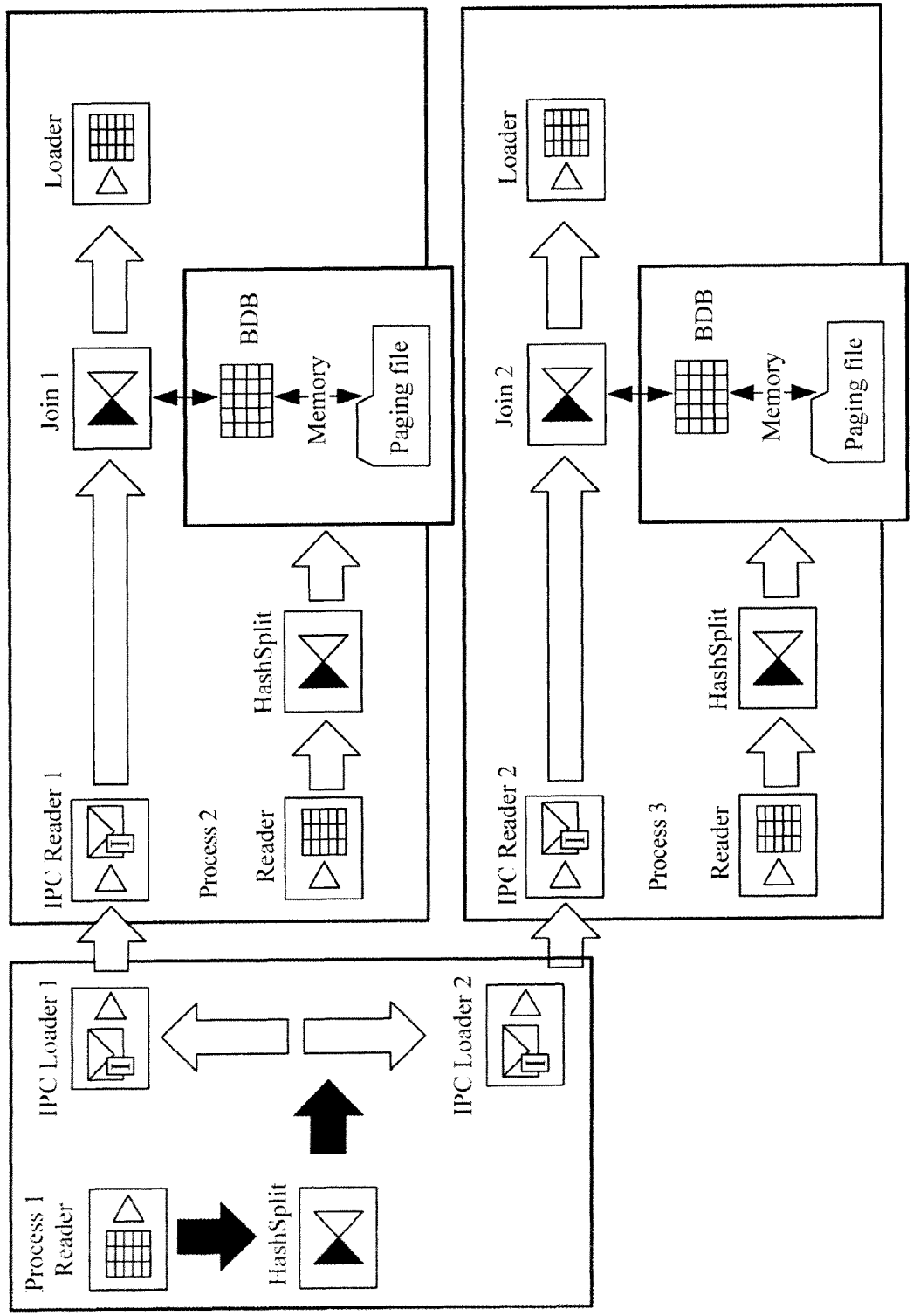
FIG. 12 illustrates a type-3 task utilizing an inner source table and a database loader.

FIG. 11 illustrates a dataflow task for a join query where the degree of parallelism is set to two. The figure illustrates 4 processes: 1100, 1102, 1104, and 1106. Process 1100 includes two readers 1108_A and 11_B and two hash splitter modules 1110_A and 1110_B. Process 1100 also includes four IPC loaders 1112_A through 112_D. The same hash function and hash key are applied on the inner and outer source. Each of the join nodes 1120_A and 1120_B gets a portion of inner and outer data to join. Therefore, the size of the inner source may avoid virtual memory limits. If the outer or inner source is a table or file, the hashing of the outer or inner source can also happen in the join sub-data flows 1102 and 1104. If the loader is a database table loader, the loading can also happen in the join sub-data flows. The number of IPC readers and loaders and the number of sub-data flows may be reduced when the inner source is a table or file and the loader is a database table, as shown in FIG. 12.

If a user puts a temporary storage transform in a dataflow to stage the output of a transform into a storage medium, such as a table or file, a type-4 task is specified. A temporary storage transform includes a loader part and a reader part. The reader part cannot be started until the loader part is finished. Therefore, a dataflow that contains a temporary storage transform that stages data to a storage medium is divided into two sub-dataflow processes. The first sub-dataflow process loads the data into the storage object and the second sub-dataflow process reads the data from the storage object.

Figure 13:
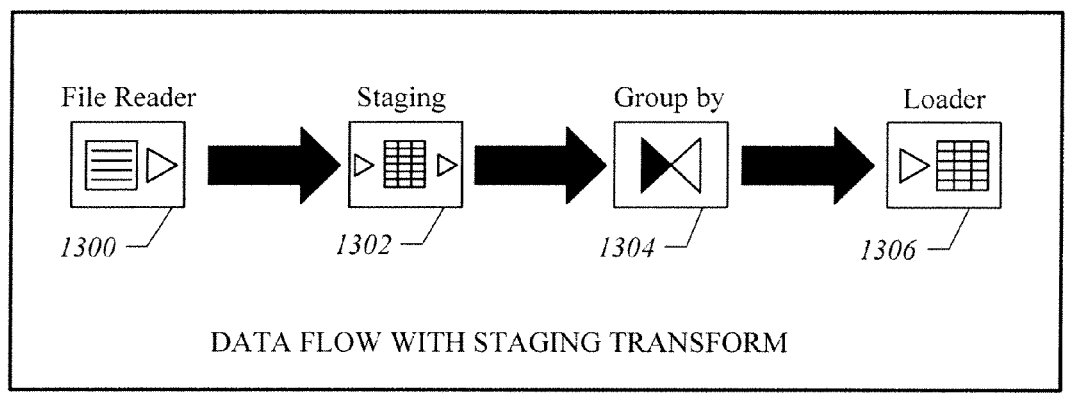
FIG. 13 illustrates a type-4 task using multiple process modes with staging between processes in accordance with an embodiment of the invention.
Figure 14:
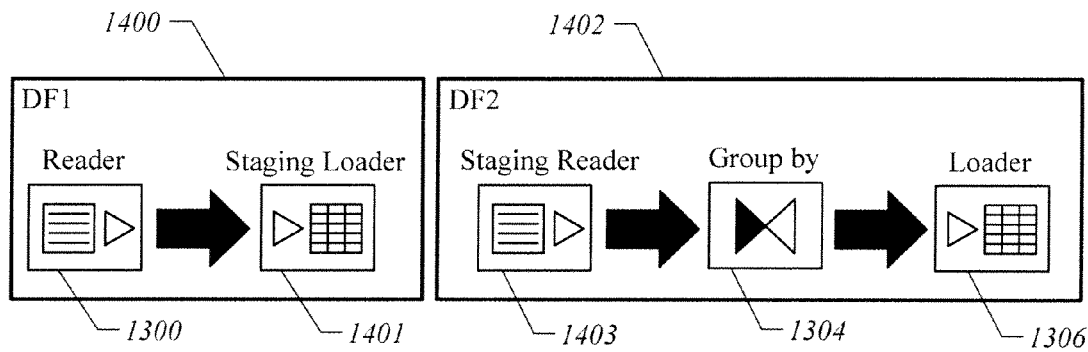
FIG. 14 illustrates data flow division of the task of FIG. 13.

FIG. 13 illustrates a dataflow task with a file reader 1300 that delivers data to a staging module 1302, which operates as a temporary storage transform. The dataflow also includes a group by module 1304 and a loader 1306. The dataflow of FIG. 13 is divided into two data flows, as shown in FIG. 14. The first dataflow 1400 includes reader 1300 and a staging loader 1401, while the second dataflow 1402 has a staging reader 1403, the group by module 1304 and the loader 1306. The second dataflow 1402 has to be executed after the first dataflow 1400. Therefore, the second dataflow 1402 has a dependency on the first dataflow 1400. This dependency can be represented with a DAG.

Figure 15:
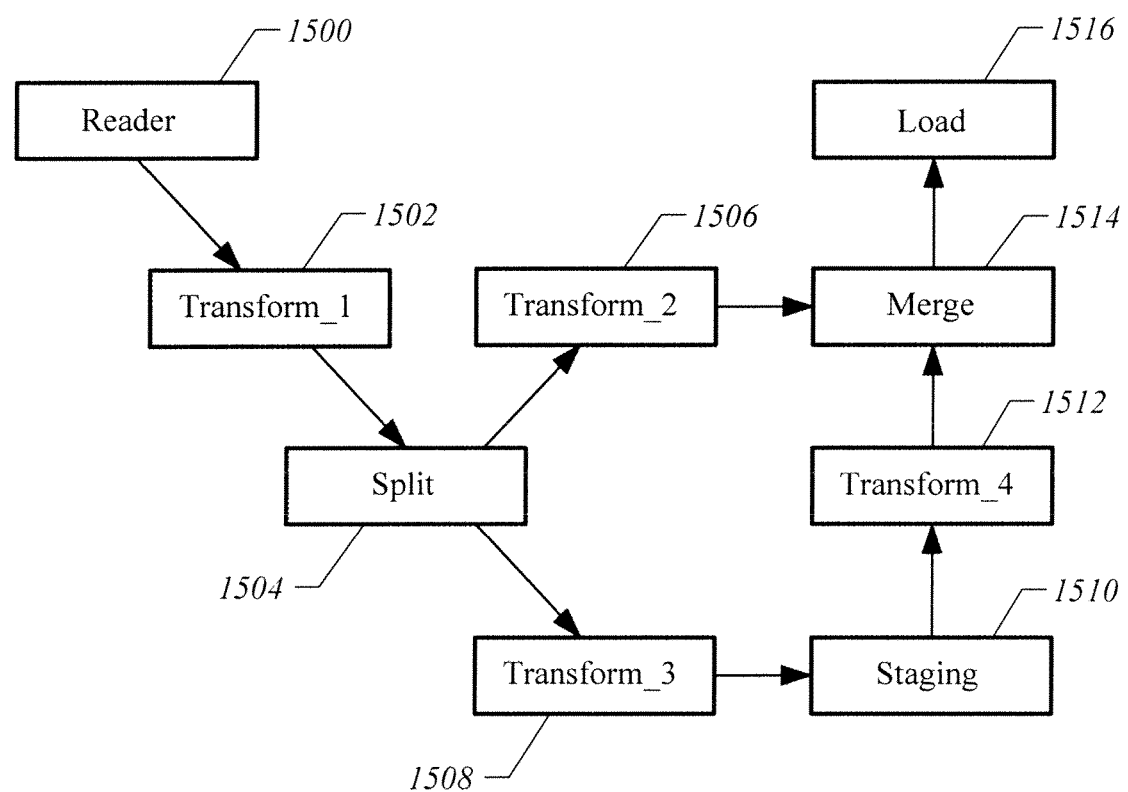
FIG. 15 illustrates multiple transform and staging operations associated with a type-4 task.
Figure 16:
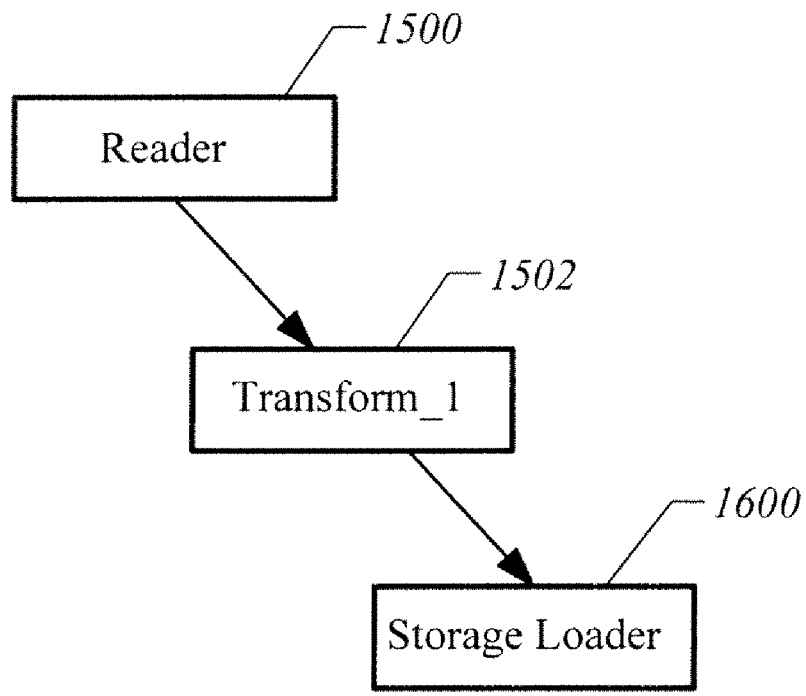
FIGS. 16-18 illustrate data flow division of the task of FIG. 15.
Figure 17:
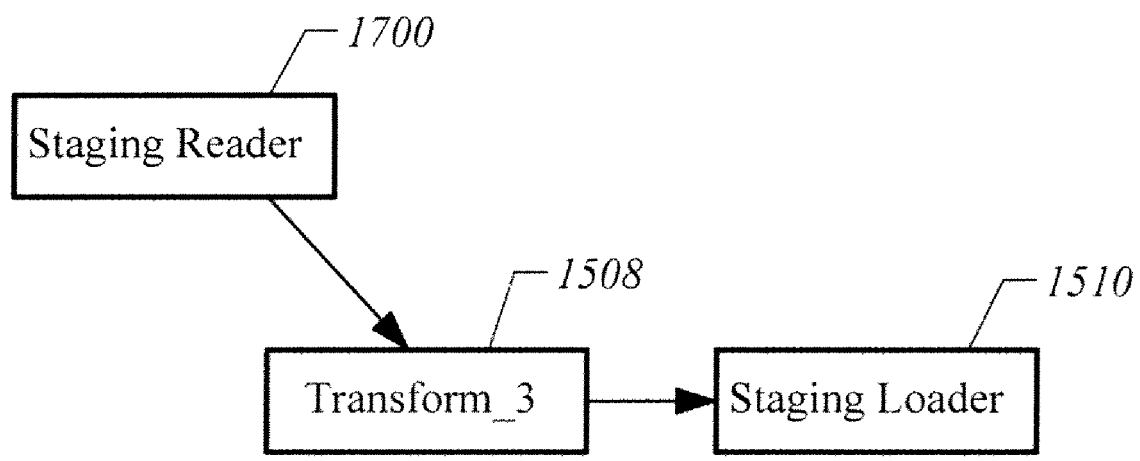
Figure 18:
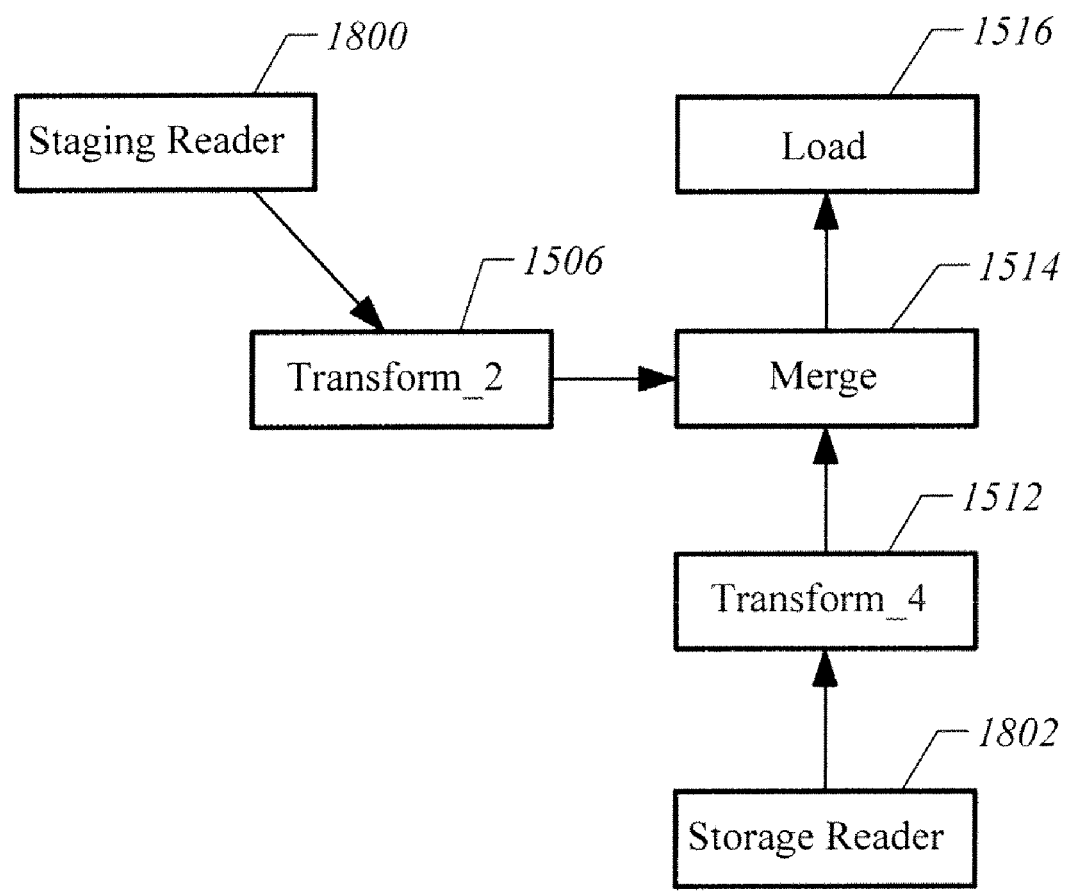

When a temporary storage transform is within a loop that is formed by a split, case transform or validation transform followed by a subsequent merge transform or join query, the data flow division module 124 inserts extra temporary storage transforms to breakdown the dataflow. FIG. 15 illustrates a reader module 1500, a first transform module 1502, a split module 1504, a second transform module 1506 and a third transform module 1508. The output of the third transform module is applied to a staging module 1510 and then a fourth transform module 1512. The output from the second transform 1506 and the fourth transform 1512 is combined at a merge module 1514, with the output being applied to a load module 1516. There is a loop formed between the split module 1504 and the merge module 1514. To break this loop, the data flow division module 124 replaces the split module 1504 with a temporary storage transform 1600, as shown in FIG. 16. A staging reader 1700 is placed in front of the third transform 1508, as shown in FIG. 17. A storage reader 1800 is added before the second transform 1506, as shown in FIG. 18. Similarly, a storage reader 1802 is placed before the fourth transform 1512. Thus, the dataflow of FIG. 15 is divided into three separate sub-tasks, as shown in FIGS. 16, 17 and 18.

Figure 19:
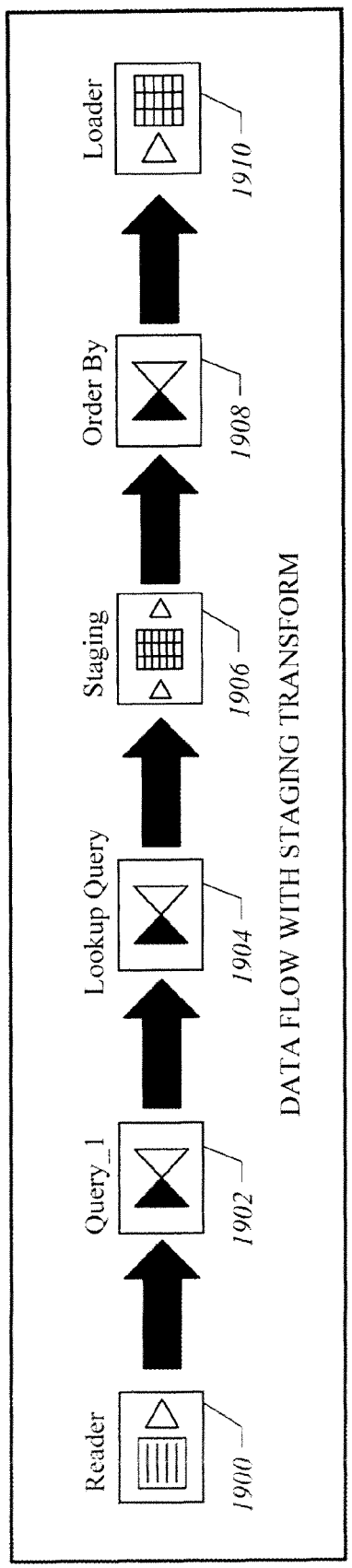
FIG. 19 illustrates a type-5 task using multiple process modes with mixed staging and inter-process communications between sub-tasks in accordance with an embodiment of the invention.
Figure 20:
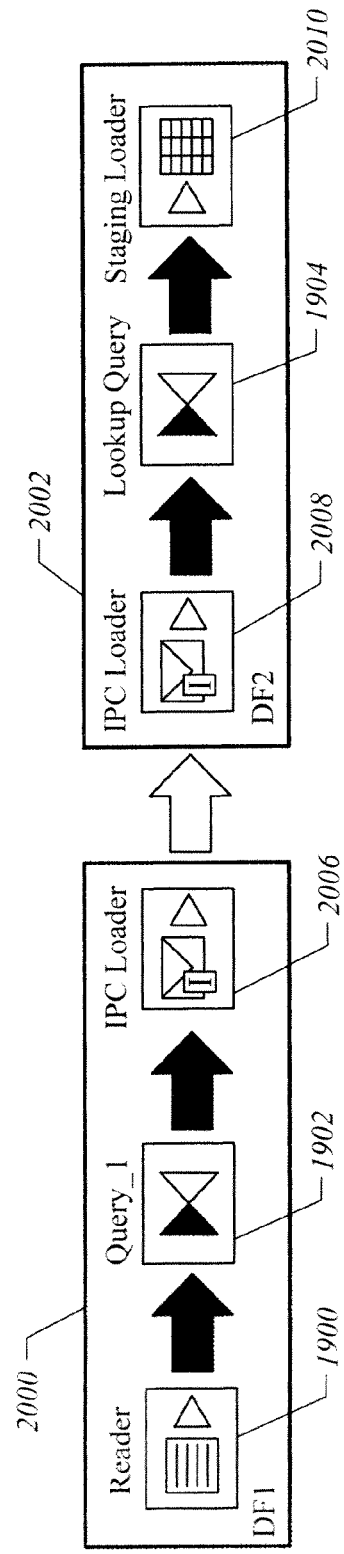
FIG. 20 illustrates data flow division of the task of FIG. 19.
Figure 20:
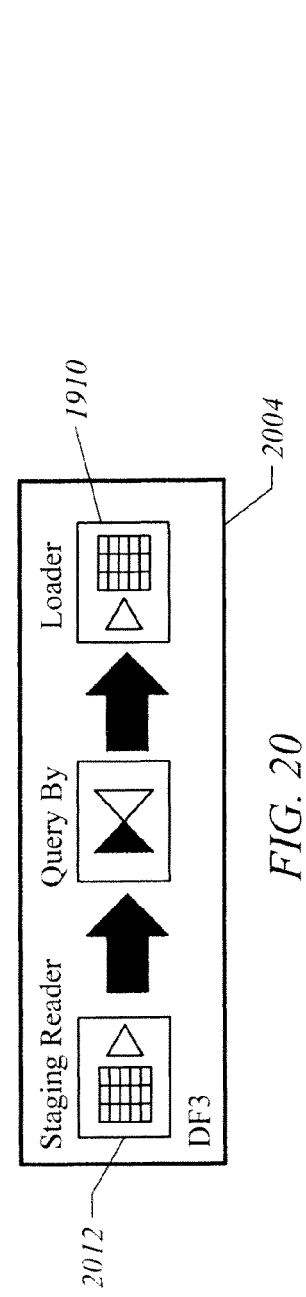

A type-5 task uses multiple process modes with mixed staging and inter-process communications between sub-tasks. Thus, if a dataflow has both a temporary storage transform and a transform or function forced to run as a separate process, the dataflow is optimized into a type-5 task. Consider the dataflow of FIG. 19, which includes a reader module 1900, a query module 1902, a lookup query module 1904, a staging module 1906, an order by module 1908 and a loader 1910. If the lookup function associated with the lookup query module 1904 is specified to be a different process, the dataflow of FIG. 19 is split into the dataflow of FIG. 20, which includes a first sub-task 2000, a second sub-task 2002 and a third sub-task 2004. FIG. 20 corresponds to FIG. 19, but an IPC loader 2006 and IPC reader 2008 have been added. In addition, the staging module 1906 is replaced with a staging loader 2010 and a staging reader 2012. Sub-tasks 2000 and 2002 have to be executed together. Sub-task 2004 is completed last.

Figure 21:
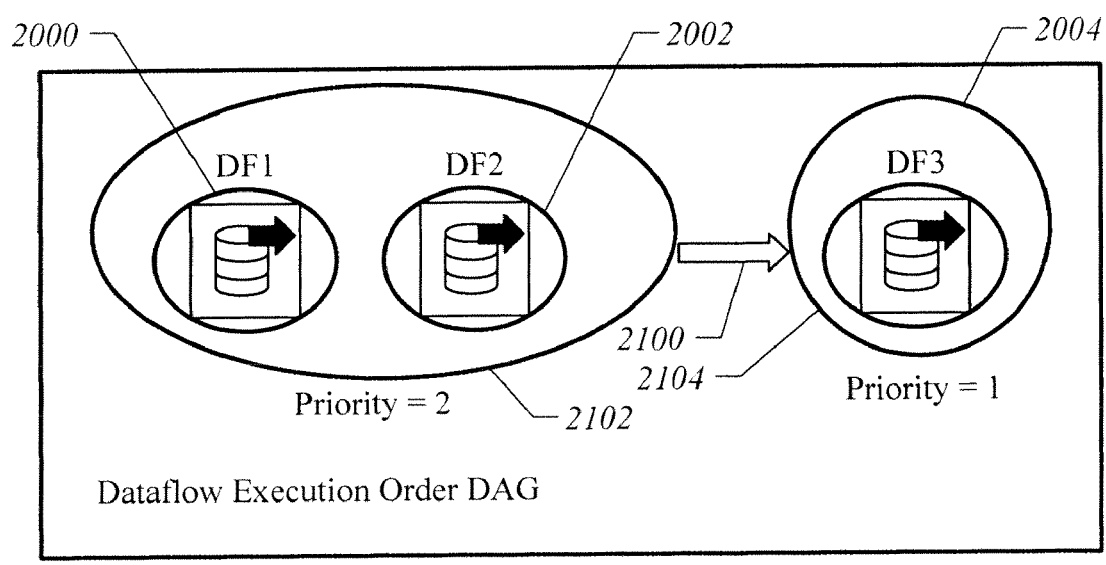
FIG. 21 illustrates assigned priorities for the task of FIG. 20.

The sub-tasks of FIG. 20 can be represented with a DAG, as shown in FIG. 21. Sub-tasks 2000 and 2002 are grouped together, as they belong to the same sub-dataflow process group that is executed together. Sub-task 2004 is its own group. A group may have from 1 to n sub-dataflow processes. The arrow 2100 indicates an execution order dependency between the two groups 2102 and 2104.

The dataflow division module 124 generates an execution plan for a dataflow based upon the 5 types of tasks discussed above. A variety of criteria may be used to select a task type. In one embodiment, a task is selected based upon the specification of the cache type, the specification of a separate process, the degree of parallelism within the dataflow, staging requirements and/or previous dataflow execution statistics. In one embodiment, the dataflow division module 124 uses the following criteria to determine which type to select.

A type-1 task is selected for a user-specified in-memory cache, a specification not to run a separate process transform or function, and the absence of a temporary storage transform. A type-2 task is selected under the same circumstances as a type-1 task, but a paging cache is specified instead of an in-memory cache. A type-3 task is specified if any of the following sub-conditions are true: a user specified partitioned cache, a pipeline temporary storage transform, or a specification to run as a separate process transform or function. A type-4 task is selected when none of the sub-conditions specified above are true and the dataflow has a temporary storage transform with a file or table specified as the storage object. A type-5 task is selected when any of the sub-conditions specified above are true and the dataflow has a temporary storage transform with a file or table specified as the storage object.

In the case of a type-2 task, the data flow division module 124 secures the number of rows and the key size information from the previous dataflow execution statistics. It uses this information to determine which cache to use and what parameters to set. If there are no statistics available, default values are used.

The DAG analysis module 126 builds a DAG that represents the execution order dependencies among the sub-dataflow processes of type-3, type-4 and type-5 tasks. Such a DAG is referred to as an execution dependency DAG. Each node in an execution dependency DAG represents a group of sub-data flows that can be executed together. Each of the sub-data flows represents a sub-dataflow process at run time. Each arrow between two nodes indicates a dependency between two groups of sub-data flows. The DAG analysis module 126 sorts the nodes on the DAG and determines a list of prioritized groups of sub-data flows. The sub-data flows belonging to the same group have the same priority and are executed together. The sub-data flows belonging to a group that has a higher priority is executed before the sub-data flows belonging to a group that has a lower priority.

The DAG analysis module 126 uses the following heuristics. A storage reader and storage loader from the same temporary store transform are in different processes. The process that runs the storage has a higher priority than the process that runs the storage reader. A storage reader and storage loader from different temporary storage transforms can be in the same process. An IPC reader and IPC loader created for the same transform are in separate processes. The processes that runs the IPC reader and IPC loader have the same priority. An IPC reader and IPC loader created for different transforms can be in the same process. Processes with different priorities are run in serial. Processes with a higher priority are run before processes with a lower priority. Processes with the same priority are run in parallel if there is a consumer/producer relationship among those processes. Processes with the same priority, but no consumer/producer relationship among them may be run in parallel or serial. Transaction loaders are executed in the same process.

The dataflow division module processes a temporary storage transform as follows. If there is a temporary storage transform participating in a loop formed by any split, case transform or validation transform followed by a subsequent merge transform or join query, insert an extra temporary storage transform to break the loops, as shown in connection with FIGS. 15-18. A temporary storage transform is inserted before any transaction loader. Any temporary storage transform is replaced with a storage loader and a storage reader. The dataflow is broken down into multiple child data flows to generate a prioritized child dataflow list based on the execution order of each child dataflow. To achieve this, a list of loaders is built. From each loader, its connected sub-graph is traversed. Two loaders are merged if they are in the same sub-graph. This produces a list of connected sub-graphs. Each sub-graph represents a child dataflow. For each temporary storage transform loader and reader pair, store the sub-graphs the storage loader and storage reader are in. The storage reader and loader from the same temporary storage transform should always be in different sub-graphs.

A DAG is built with each node representing a sub-graph. For the storage loader and reader from the same temporary storage transform, draw a line from the node that represents the sub-graph where the storage loader is in to the node that represents the sub-graph that the storage reader is in. The DAG is then topologically sorted to get the execution order of each child dataflow. The child data flows that contain only storage readers and loaders to transactional loaders must have the lowest priorities. Those child data flows are merged together so that they can be executed within one process.

The communication module 130 supports inter-process communications as follows. For each child dataflow, add hash splits, join or group by and merge modules as a function of the degree of specified parallelism. For join and group by operations, add split, transform and merger operations for transforms. For lookup operations, the optimizer splits a new query node during the split phase. Remove any consecutive merge and split pair. Add an IPC reader and an IPC loader for join, group by, table comparison, sort, distinct, lookup and hierarchy flattening that runs as a separate process. The IPC loader should be added as late as possible so that the transforms or functions that are to run as separate processes will be combined with the transforms that do not need to run as separate processes. Further break down the child data flows into sub-data flows. Do not break down the child dataflow that contains the transactional loaders. The sub-data flows belonging to a single child dataflow are executed together. To achieve this, build a list of loaders that may include normal dataflow loaders, storage loaders and IPC loaders. From each loader, traverse its connected sub-graph. Merge the two loaders if they are in the same connected sub-graph. This produces a list of connected sub-graphs. Each sub-graph represents a sub-dataflow process. If the child dataflow contains only one sub-graph, that child dataflow is run as a single sub-dataflow process.

When the sub-dataflow processes are started, each receives execution instructions. The sub-dataflow process optimizes the entire dataflow and gets a list of prioritized groups of sub-data flows. The sub-dataflow process then compiles only the sub-dataflow that it is told to execute. The result of the compilation is a dataflow execution object that represents a sub-dataflow process.

Figure 22:
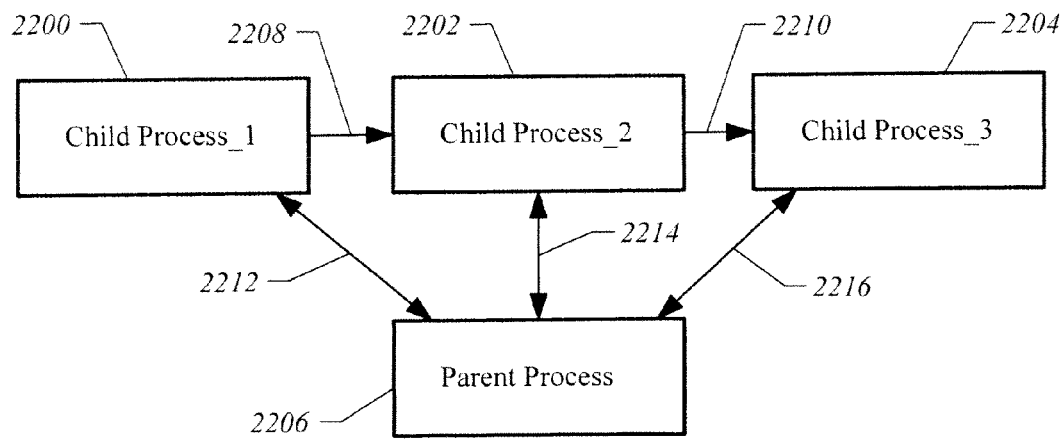
FIG. 22 illustrates architecture for named pipe and peer-to-peer communications between tasks.
Figure 23:
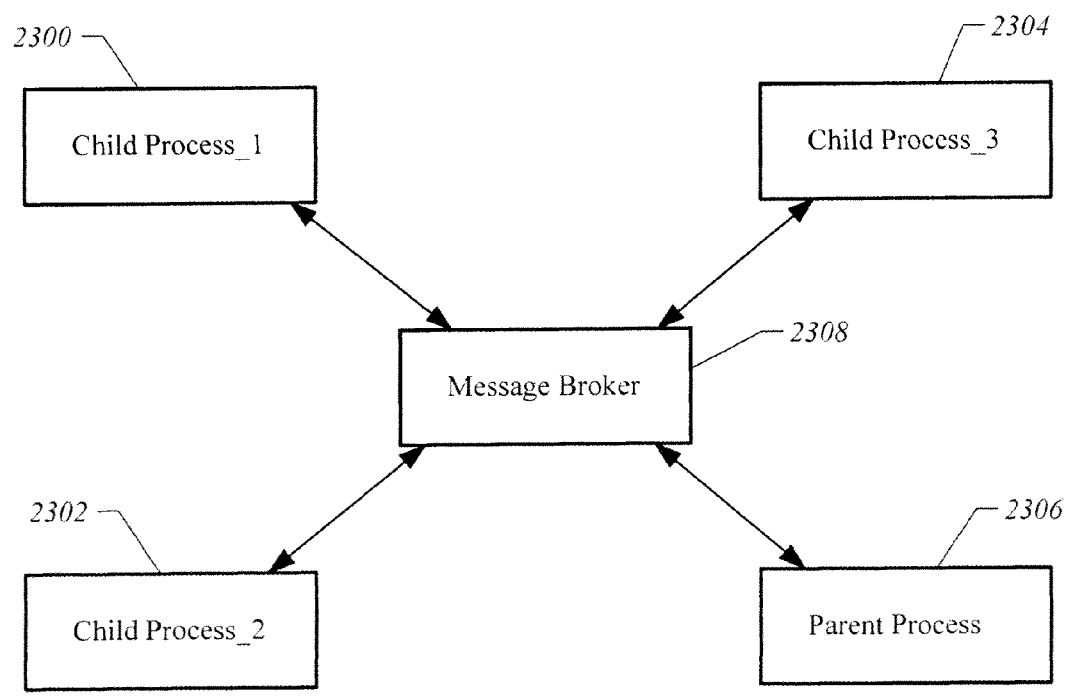
FIG. 23 illustrates a centralized message broker architecture that may be utilized between sub-tasks in accordance with an embodiment of the invention.

If all processes are running on the same machine, then the communication module 130 uses a named pipe communication scheme. FIG. 22 illustrates child processes 2200, 2202 and 2204 communicating with a parent process 2206 via various named pipes 2208-2216. If a peer-to-peer communication method is used, the communication module 130 provides a range of port numbers to support communication. For example, links 2208-2216 of FIG. 22 may be specified TCP connections. FIG. 23 illustrates a message broker architecture that may be utilized in accordance with an embodiment of the invention. Child processes 2300-2304 communicate with a parent process 2306 via a message broker 2308. The message broker 2308 is a process that may operate on any available server.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices: magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
assess system cache resources, inter-process communication requirements and staging requirements to divide an extract, transform, load (ETL) dataflow task into a plurality of sub-tasks; and
execute the sub-tasks on distributed resources;
wherein a directed acyclic graph (DAG) is generated that represents execution order dependencies among the plurality of sub-tasks and is used to divide the ETL task based on the accessed system cache resources, inter-process communication requirements and staging requirements, each node of the DAG representing a group of sub-data flows that can be executed together, each of the sub-data flows representing a sub-task process at run time, arrows between two nodes of the DAG indicating a dependency between two groups of sub-data flows;
wherein:
the nodes of the DAG are sorted to generate a list of prioritized group of sub-data flows;
the sub-tasks are executed according to execution priorities specified by the list of prioritized groups of sub-data flows such that:
sub-data flows having different priorities are run in serial;
sub-data flows belonging to a group having a higher priority are executed prior to sub-data flows belonging to groups having a lower priority; and
sub-data flows having a same priority are run in serial or in parallel.

2. The non-transitory computer readable storage medium of claim 1 wherein at least one sub-task is a type-1 task using a single process mode with in-memory cache.

3. The non-transitory computer readable storage medium of claim 1 wherein at least one sub task is a type-2 task using a single process mode with a pageable cache.

4. The non-transitory computer readable storage medium of claim 1 wherein at least one sub task is a type-3 task using multiple process modes with inter-process communication.

5. The non-transitory computer readable storage medium of claim 1 wherein at least one sub task is a type-4 task using multiple process modes with staging between processes.

6. The non-transitory computer readable storage medium of claim 1 wherein at least one sub task is a type-5 task using multiple process modes with mixed staging and inter-process communications between sub-tasks.

7. The non-transitory computer readable storage medium of claim 1 wherein the executable instructions to assess include executable instructions to assess previous job execution statistics.

8. The non-transitory computer readable storage medium of claim 7 wherein the executable instructions to assess include executable instructions to identify pipelined sub-tasks to be run in parallel.

9. The non-transitory computer readable storage medium of claim 7 wherein the executable instructions to assess include executable instructions to identify staged sub-tasks to be run in serial.

10. The non-transitory computer readable storage medium of claim 1 wherein the executable instructions to assess include executable instructions to assess cluster level resources.

11. The non-transitory computer readable storage medium of claim 1 wherein the executable instructions to assess include executable instructions to assess current resource loads.

12. The non-transitory computer readable storage medium of claim 1 wherein the executable instructions to assess include executable instructions to assess locality of objects to be accessed by sub-tasks.

13. The non-transitory computer readable storage medium of claim 1 further comprising executable instructions to support named pipe communications between sub-tasks.

14. The non-transitory computer readable storage medium of claim 1 further comprising executable instructions to support peer-to-peer communications.

15. The non-transitory computer readable storage medium of claim 1 further comprising executable instructions to support centralized message broker communications.

16. The non-transitory computer readable storage medium of claim 1, wherein:
the task types are selected from a group consisting of: a type-1 task, a type-2 task, a type 3-task, a type-4 task, and a type-5 task;
type-1 tasks use a single process mode with in-memory cache;
type-2 tasks use a single process mode with a paging cache;
type-3 tasks use multiple process modes with inter-process communication;
type-4 tasks use multiple process modes with staging between processes; and
type-5 tasks use multiple process modes with mixed staging and inter-process communications between sub-tasks.

17. A method for implementation by one or more data processors comprising:
assessing, by at least one data processor, system cache resources, inter-process communication requirements and staging requirements to divide an extract, transform, load (ETL) dataflow task into a plurality of sub-tasks; and
executing, by at least one data processor, the sub-tasks on distributed resources;
wherein a directed acyclic graph (DAG) is generated that represents execution order dependencies among the plurality of sub-tasks and is used to divide the ETL task based on the accessed system cache resources, inter-process communication requirements and staging requirements, each node of the DAG representing a group of sub-data flows that can be executed together, each of the sub-data flows representing a sub-task process at run time, arrows between two nodes of the DAG indicating a dependency between two groups of sub-data flows;
wherein:
the nodes of the DAG are sorted to generate a list of prioritized group of sub-data flows;
the sub-tasks are executed according to execution priorities specified by the list of prioritized groups of sub-data flows such that:
sub-data flows having different priorities are run in serial;
sub-data flows belonging to a group having a higher priority are executed prior to sub-data flows belonging to groups having a lower priority; and sub-data flows having a same priority are run in serial or in parallel.

18. A system comprising:

at least one data processor;

memory storing instructions, which when executed, cause the at least one data processor to perform operations comprising:

assessing system cache resources, inter-process communication requirements and staging requirements to divide an extract, transform, load (ETL) dataflow task into a plurality of sub-tasks; and executing the sub-tasks on distributed resources;

wherein a directed acyclic graph (DAG) is generated that represents execution order dependencies among the plurality of sub-tasks and is used to divide the ETL task based on the accessed system cache resources, inter-process communication requirements and staging requirements, each node of the DAG representing a group of sub-data flows that can be executed together, each of the sub-data flows representing a sub-task process at run time, arrows between two nodes of the DAG indicating a dependency between two groups of sub-data flows;

wherein:

the nodes of the DAG are sorted to generate a list of prioritized group of sub-data flows;

the sub-tasks are executed according to execution priorities specified by the list of prioritized groups of sub-data flows such that:

sub-data flows having different priorities are run in serial;

sub-data flows belonging to a group having a higher priority are executed prior to sub-data flows belonging to groups having a lower priority; and sub-data flows having a same priority are run in serial or in parallel.

* * * * *